WILLIAM J. RIPLEY.
Improvement in Clothes-Line Protectors and Stretchers.

No. 114,345.          Patented May 2, 1871.

Attest.
T. Van Kannel
John Cannon

Inventor
Wm. J. Ripley

United States Patent Office.

WILLIAM J. RIPLEY, OF CINCINNATI, OHIO.

Letters Patent No. 114,345, dated May 2, 1871.

IMPROVEMENT IN CLOTHES-LINE PROTECTORS AND STRETCHERS.

The Schedule referred to in these Letters Patent and making part of the same.

*To all whom it may concern:*

Be it known that I, WILLIAM J. RIPLEY, of Cincinnati, in the county of Hamilton and State of Ohio, have invented a new and useful Improvement in Clothes-Line Protector and Stretcher; and I do hereby declare that the following is a full, clear, and exact description thereof, reference being had to the annexed drawing making a part of this specification, in which—

Similar letters of reference indicate like parts.

Figure 1:
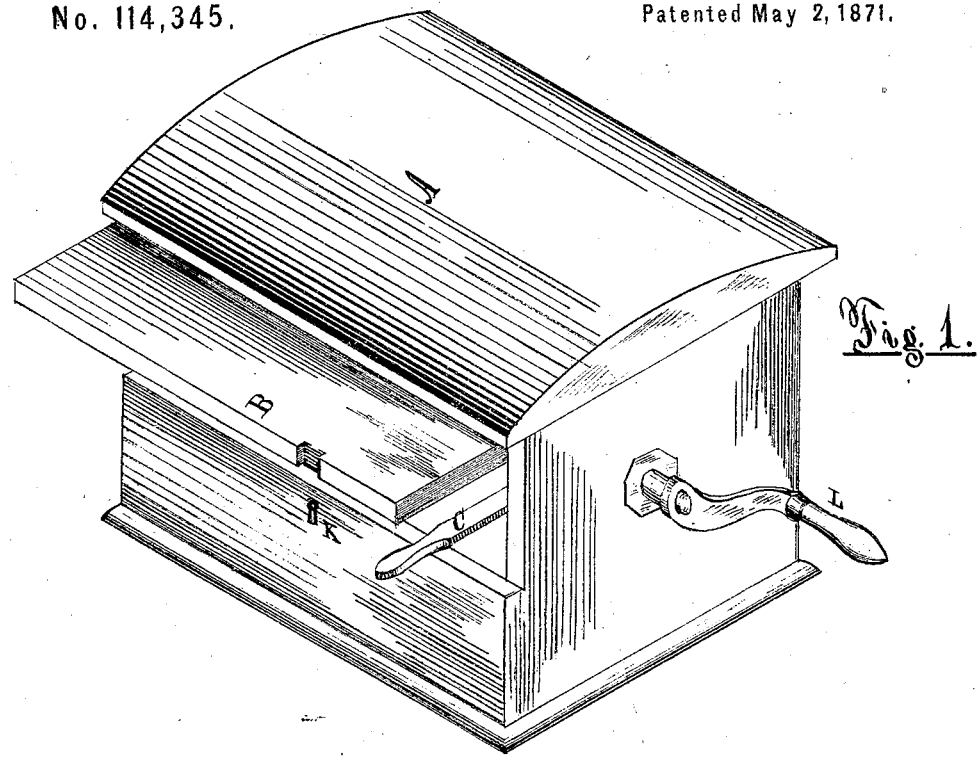
Figure 1 is a perspective.
Figure 2:
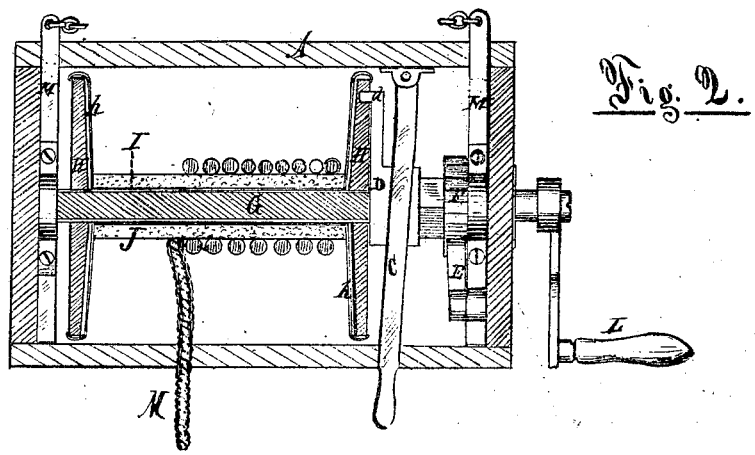
Figure 2 is a longitudinal horizontal cross-section.

The nature of my invention relates to a device for winding up and stretching clothes-lines, as well as for protecting them from the injury of exposure to the weather, danger of loss from theft, and keeps them clean and unkinked.

It consists of a suitable receptacle or box, with a shaft running longitudinally through the center on which rotates a windlass or reel.

The shaft is surrounded by a metallic tube, and this tube is covered by a rubber tube, to prevent the iron from rusting and thus injuring the clothes.

The disks of the windlass consist of a loose framework of castings covered by zinc or galvanized sheet-iron.

A crank outside the box communicates with the reel by a clutch, and a lever projects in front, whereby the connection with the crank may be broken, enabling one to draw out the rope without effecting the state of the crank.

A pawl and ratchet on crank-hub holds the line at any degree of tension required.

A lid in front of the box is opened when the machine is to be put in use, and a lock is provided for locking up the box after winding the line.

The construction of my invention is as follows:

A is the box containing the reel;

B, the lid, represented open in the drawing; and

C, the lever operating the clutch D.

At E is seen the pawl, and

F the ratchet, secured permanently to the shaft G.

The part of the shaft on which the clutch D is placed is made square, and the clutch fitting it loosely, so as to allow its sliding longitudinally, but rotates with it.

The projection $d$ engages with the frame H of the windlass.

The shaft D is surrounded by a metallic tube, I, which is secured to frame H, and some non-corroding sheet metal is formed around the frame H, as seen at $h$.

The rubber tube J on tube I gives the action of the windlass an elasticity, and obviates the injury to the line from rust forming on the metallic tube I.

At K is a lock for securing the lid when the machine is out of use.

The crank L is permanent on the shaft G.

The operation of my invention becomes obvious.

When it is first put to use the lid B is opened, the lever C is moved to the right, disengaging the clutch D from the frame H; the line M being drawn out, the windlass rotates on the shaft G without moving the crank L.

After the line has been sufficiently drawn out, and having been run over suitable rollers, and the end secured, the lever may be again pressed to the left, and the line may be wound up by turning the crank L.

After the clothes have been hung on the line it may be stretched, so as to keep the clothes well off the ground.

The line may thus be lowered or elevated to suit occasion, and what has been a laborious task may hereby be made comparatively easy, and the risk of having a whole wash to fall to the ground to be rewashed will be avoided.

It will be observed that a part of the chain represented in the drawing is attached to the bars which form the boxes in which rotate the shaft G. This takes all the strain off the box, and should the line stretch by the effects of moisture from the clothes there will be no danger of breaking the box, as all the strain is received by the bars.

Having thus described my invention,

What I claim as new, and desire to secure by Letters Patent, is—

1. The combination of the clutch D $d$, lever C, and pawl and ratchet E F with the shaft G, as described, and armed wheel H, of a clothes-line reel, all arranged and operating substantially as and for the purposes described.

2. The shaft G of a clothes-line reel, when protected by an inner covering, I, of metal, and an outer one, J, of India rubber, substantially as and for the purposes described.

WM. J. RIPLEY.

Witnesses:
T. VAN KANNEL,
JOHN CANNON.